UNITED STATES PATENT OFFICE.

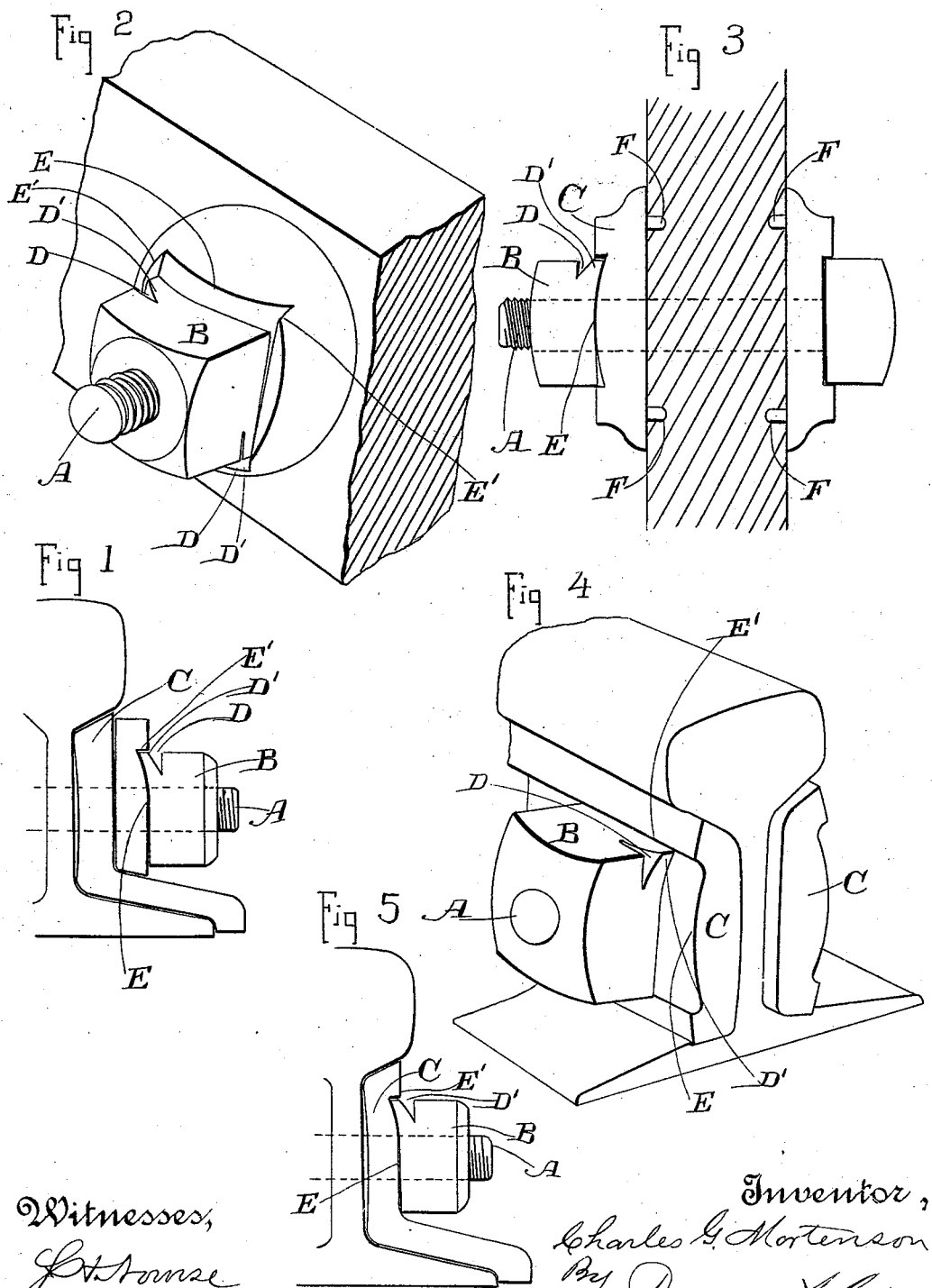

CHARLES G. MORTENSON, OF LORIN, CALIFORNIA.

LOCK-NUT.

SPECIFICATION forming part of Letters Patent No. 540,508, dated June 4, 1895.

Application filed March 14, 1895. Serial No. 541,795. (No model.)

*To all whom it may concern:*

Be it known that I, CHARLES G. MORTENSON, a citizen of the United States, residing at Lorin, county of Alameda, State of California, have invented an Improvement in Lock-Nuts; and I hereby declare the following to be a full, clear, and exact description of the same.

My invention relates to a means for safely locking and holding nuts upon bolts to be used in securing the fish-plates of railway rails or for other mechanical uses.

It consists in certain details of construction which will be more fully explained by reference to the accompanying drawings, in which—

Figure 1 shows the application to the ordinary fish-plate. Fig. 2 shows the application to a washer for other purposes. Fig. 3 is an edge view of Fig. 1. Figs. 4 and 5 are modified forms of my invention.

The object of my invention is to provide a simple nut lock which is secured while in use but may at any time be easily disengaged for removal.

A is a screw-threaded bolt of any description.

B is a nut adapted to fit the screw-threads of this bolt.

C is a fish-plate, washer, or other surface upon which the nut is to be screwed down. This nut may be rectangular, hexagonal or of other desired polygonal form.

The nut has small slots or cuts D made in one or more of its angles extending inwardly toward the center, and preferably inclining so that the thinnest portion of the flange or tongue D' is at the exterior, and the convex portion at the interior of the cut. This cut is made so near the face of the nut that it forms a weakened wall so that by introducing a cold chisel or other wedge-shaped tool, and striking it with a hammer, the point separated by the cut, is easily turned outward as shown in the drawings. In order to make this available, I have shown the fish-plate or washer having a convex surface E of a width equal to the length of one of the sides of the nut, and exterior to the convex surface. The washer extends a short distance essentially at the same height with the highest point of the convexity, thus leaving a channel upon each side of the convexity forming shoulders as shown at E'. It will be seen that when the nut has been turned until any two of its sides are parallel with these shoulders, either one of the tongues D' formed by the slotted angles which are accessible, may be bent down so as to engage the shoulder of the washer or fish-plate, and thus prevent the nut from being turned backward. In the form of fish-plate ordinarily adopted for use upon railways which has an L-shaped flange extending down over the rail flange, it is only necessary to have the grooved channel and shoulder E' formed upon the upper side of the fish-plate, as this is the only part that will be accessible for bending the tongue and locking the nut. In narrow plates where both edges are accessible, a double groove or channel can be made.

In the use of circular washers, the convexed portion E extends across from one side to the other of the top of the washer, having the grooves or channels with the shoulder upon each side, and the washer (if one be used) upon the opposite side in which the head of the bolt fits, may be also grooved or channeled to receive the head of the bolt and prevent its being turned. The washers will preferably have points F projecting from their inner faces which, where the washers are used against wooden surfaces, would enter the wood and prevent either of the washers from turning, thus enabling the nut to be turned upon the bolt as tight as may be desired.

If the bolt becomes loose by constant jar or usage as in the case of railway rails, it will be seen that by turning it a short distance in advance, the turned down point or tongue of the nut will be moved up the convex surface of the fish-plate or washer, and this will force it back into its normal position, leaving the inner surface of the nut essentially flat so that it can be turned in either direction as much as may be desired; the point being afterward forced down again when the nut has been turned on or tightened to the desired point.

Having thus described my invention, what I claim as new, and desire to secure by Letters Patent, is—

1. A nut adapted to fit a threaded bolt, having a normally closed slit cut in its angle near its inner face to form a weakened wall whereby said wall may be expanded beyond the plane of the inner face of the nut to form a tongue or point, and may be forced backward into its normal position to essentially close said slit.

2. A polygonal nut having slits cut in one or more of its angles near the inner face, a plate or washer against which the nut is to be screwed, said plate having a convex surface with grooves or channels formed upon each side coincident with the sides of the nut, when the latter stands parallel thereto whereby the tongues or points formed upon the angles of the nuts may be forced into said channels and locked against the shoulders formed upon the sides thereon.

In witness whereof I have hereunto set my hand.

CHARLES G. MORTENSON.

Witnesses:
S. H. NOURSE,
J. A. BAYLESS.